United States Patent [19]

Poleri

[11] 4,058,909
[45] Nov. 22, 1977

[54] CONSTRUCTION KIT

[76] Inventor: Victor Joseph Poleri, 207 E. 15 St., New York, N.Y. 10003

[21] Appl. No.: 733,097

[22] Filed: Oct. 18, 1976

[51] Int. Cl.² .................... G09B 19/00; A63H 33/10
[52] U.S. Cl. ........................................... 35/16; 46/12; 46/23; 46/31
[58] Field of Search .................. 35/16; 46/12, 19, 21, 46/23, 31

[56] References Cited

U.S. PATENT DOCUMENTS

| 1,742,905 | 1/1930 | Friedel | 35/16 X |
| 2,968,118 | 1/1961 | Paulson | 46/12 X |
| 3,405,458 | 10/1968 | Sylwan | 46/31 X |
| 3,729,881 | 5/1973 | Disko | 46/12 X |
| 3,902,291 | 9/1975 | Zucht | 35/16 X |

FOREIGN PATENT DOCUMENTS

| 52,063 | 8/1936 | Denmark | 46/31 |
| 439,863 | 9/1934 | United Kingdom | 46/23 |

Primary Examiner—Harland S. Skogquist
Attorney, Agent, or Firm—Amster & Rothstein

[57] ABSTRACT

A kit is provided for constructing model buildings. The kit includes modular blocks, which are interlocked to form a roof and structral walls corresponding to the outer shell of the building, and also includes construction brackets which are abutted in side-by-side alignment at the top edge of a structural wall to form a supporting ledge. Such ledges are used to form setbacks and overhangs in the building structure and for supporting the roof. Each bracket includes a generally horizontal main wall with bounding inner and outer edges and two lateral edges each extending between the inner and outer edges. At each of the inner and outer edges, the bracket is provided with lower and upper connectors. The lower connector is designed to secure the bracket to the top edge of a structural wall disposed below the bracket, and the upper connector is designed to secure the lower edge of a structural wall disposed above the bracket. A setback is formed by mounting the brackets along the top edge of a lower structural wall by mean of their outer, lower connectors while anchoring an upper structural wall by means of the inner, upper connector on each bracket, whereas an overhang is formed by supporting the brackets along the top edge of a lower structural wall by means of their inner, lower connectors while anchoring an upper structural wall by means of the outer, upper connector on each bracket. The roof may be supported on either a setback or overhung ledge.

16 Claims, 14 Drawing Figures

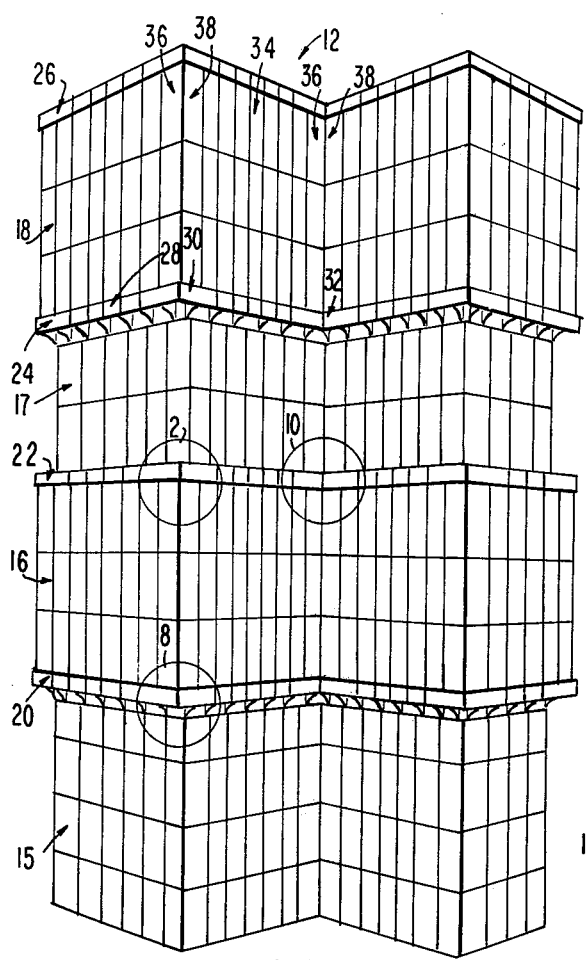
FIG. 1
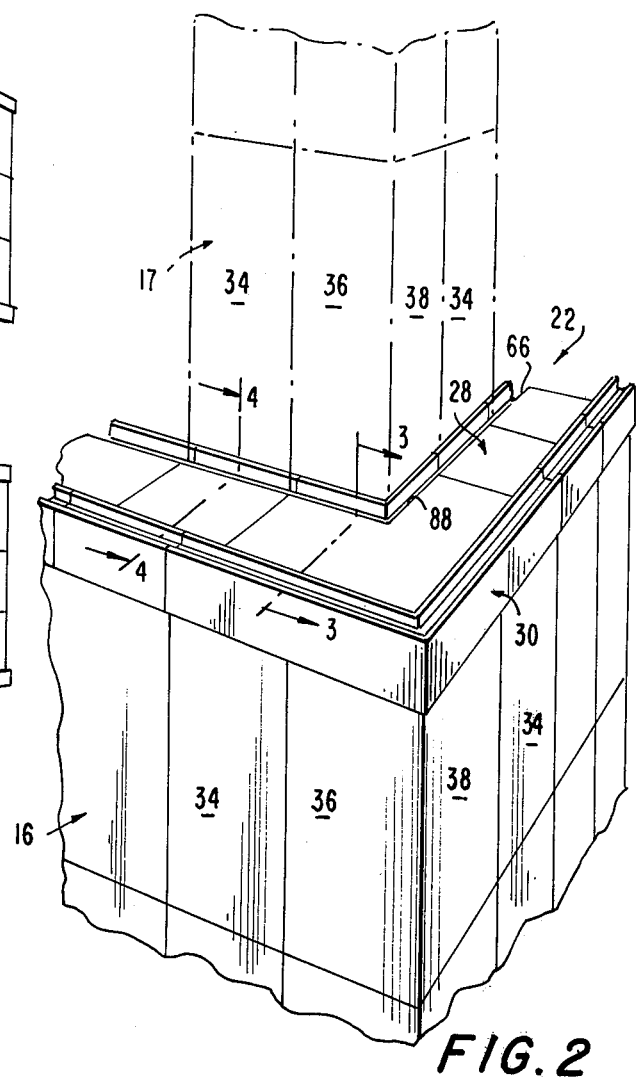
FIG. 2
FIG. 3
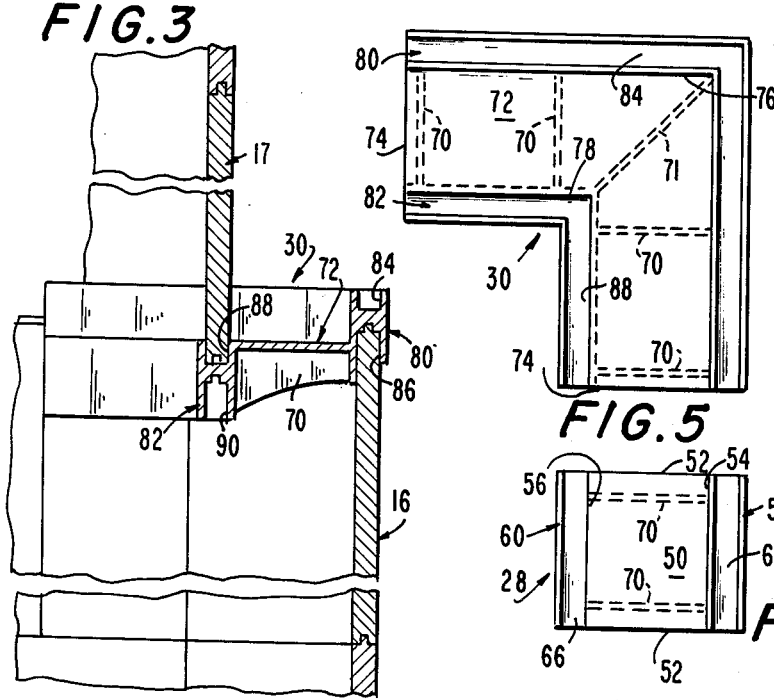
FIG. 5
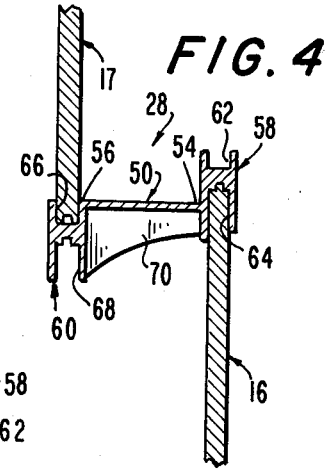
FIG. 4
FIG. 6

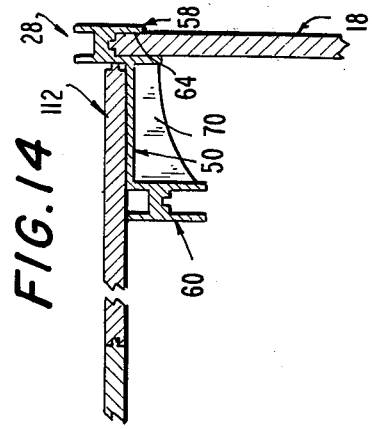
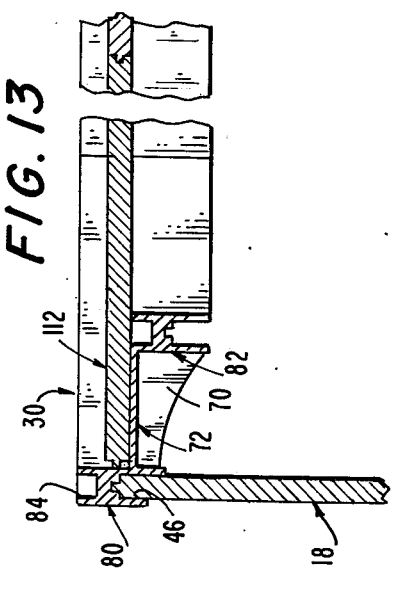
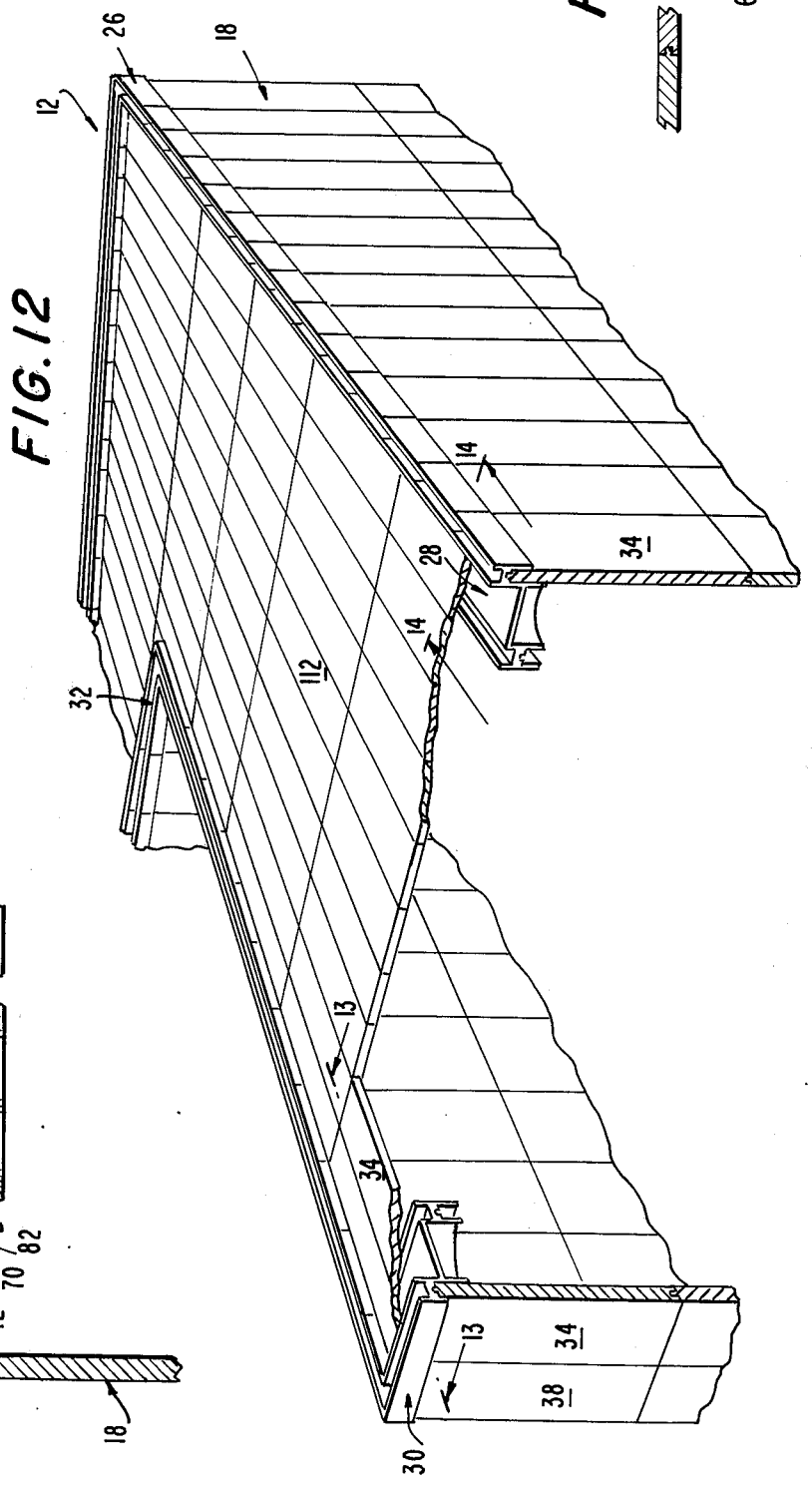

CONSTRUCTION KIT

This invention relates generally to model buildings and particularly to a kit including a plurality of components for constructing a wide variety of model architectural structures.

Construction kits have long been used as toys. In addition, when designed to produce buildings having a realistic appearance, such kits find more practical applications. For example, such kits can be used by architects in visualizing and planning new buildings and for constructing models of buildings to better demonstrate spatial relationships therein. Such kits could also be used to construct models of buildings for exhibition purposes. Another common application for such construction kits is in model railway installations, and the like.

A number of features of existing construction kits have led to their general acceptance and wide use. Chief among these features is the provision of interlocking elements. This feature prevents collapse of the building during construction and permits careful construction over an extended period of time without fear that the building will accidentally collapse. Also, since the elements of the kit are held together without bonding, changes in design are easily made during construction and the builder can experiment with different designs while constructing the building. Furthermore, the relative permanence of the structure resulting from interlocking elements permits its retention and its uses as previously described.

Although construction kits are available for making various architectural structures, they possess a number of disadvantages undesirable in such kits. Typically, such construction kits are incapable of conveniently or realistically simulating certain modern architectural effects. For example, setbacks, in which the upper floors of a building are recessed with respect to the lower floors, and overhangs, in which the lower floors of a building are recessed with respect to the upper floors, are very popular in modern buildings and cannot effectually be simulated with existing construction kits. Furthermore, although existing construction kits have been provided with modular elements, they typically require a relatively large number of different types of elements to achieve flexibility in constructing different structures. The relatively large number of differet types of elements makes the construction kits unnecessarily expensive and inconvenient to use.

Broadly, it is an object of this invention to provide a construction kit for model buildings which eliminates one or more of the disadvantages of existing construction kits. In particular, it is within the contemplation of this invention that model buildings constructed with the kits in accordance with the invention bear a close resemblance to rear buildings.

It is another object of this invention to provide a kit for constructing model buildings which can realistically simulate the setbacks and overhangs found in modern architectural structures.

It is another object of this invention to provide a construction kit including interlocking elements which are sturdy in construction, interlock conveniently and reliably, and yet are low in cost.

In accordance with one aspect of the invention, construction brackets are provided which can be mounted in side-by-side alignment at the top of a structural wall in a model building to form a supporting ledge. Such ledges are used to form setbacks and overhangs in the building structure and for supporting the roof. Each bracket includes a generally horizontal main wall with bounding inner and outer edges and two lateral edges each extending between the inner and outer edges. At each of the inner and outer edges, the bracket is provided with lower and upper connectors. The lower connector is designed to secure the bracket to the top of a structural wall disposed below the bracket and the upper connector is designed to secure the lower end of a structural wall disposed above the bracket. As a result of this bracket construction, a setback ledge can be formed by aligning brackets at the top of a lower structural wall so that lateral edges of adjacent brackets abut. The brackets are secured to the wall by means of the lower connector at the outer edge of each bracket and each bracket extends inwardly of the structural wall. The setback is completed by securing an upper structural wall in the upper connectors at the inner edge of each bracket. An overhung ledge is formed by aligning the brackets at the top of a structural wall so that the lateral edges of adjacent brackets abut. The brackets are secured to the structural wall by means of the lower connector at the inner edge of each bracket and each bracket extends outwardly beyond the structural wall. The overhang is completed by securing an upper structural wall in the upper connector at the outer edge of each bracket. The roof of the building is supported on either a setback or overhung ledge by being rested on the brackets' main walls.

In accordance with an illustrative embodiment demonstrating objects and features of the present invention, there is provided a construction kit for model buildings. The kit includes three different types of modular interlocking blocks for forming structural walls and roofs: a center block is provided for forming flat sections of wall; and a pair of complementary corner blocks are provided for forming square corners, including outside corners (i.e. when the outer surfaces of the corner elements form an angle of 270°) and inside corners (i.e., when the outer surfaces of corner elements form an angle of 90°). The kit also includes three different shapes of brackets of the type previously described: a center bracket in which the inner and outer edges of the main wall are of equal length and are parallel; an outside corner bracket in which the inner and outer edges of the main wall are generally L-shaped, the outer edge being longer than the inner edge; and an inside corner bracket in which the inner and outer edges of the main wall are L-shaped, the inner edge being longer than the outer edge. A construction kit including only these six types of elements can be used to construct numerous different buildings incorporating any or all of the architectural effects previously described.

The foregoing brief description, as well as further objects, features and advantages of the present invention, will be more completely understood by reading the following detailed description of a presently preferred, but nonetheless illustrative, embodiment of the present invention, with reference being had to the accompanying drawing wherein:

FIG. 1 is a perspective drawing of a typical building constructed with a construction kit in accordance with the present invention;

FIG. 2 is a fragmentary perspective drawing of circled area 2 of FIG. 1, drawn on an enlarged scale to better illustrate details of a setback outside corner;

FIG. 3 is a sectional view taken substantially along contour 3—3 and looking in the direction of the arrows in FIG. 2;

FIG. 4 is a sectional view taken substantially along contour 4—4 and looking in the direction of the arrows in FIG. 2;

FIG. 5 is a top plan view of an outside corner bracket;

FIg. 6 is a top plan view of a center bracket;

FIG. 12 is a fragmentary perspective view, on an enlarged scale, of the upper portion of the model building as seen from the upper right-hand corner in FIG. 1, parts being cut away to show construction details;

FIG. 13 is a fragmentary sectional view taken substantially along contour 13—13 and looking in the direction of the arrows in FIG. 12;

FIG. 14 is a fragmentary sectional view taken substantially along contour 14—14 and looking in the direction of the arrows in FIG. 12.

Figure 7:
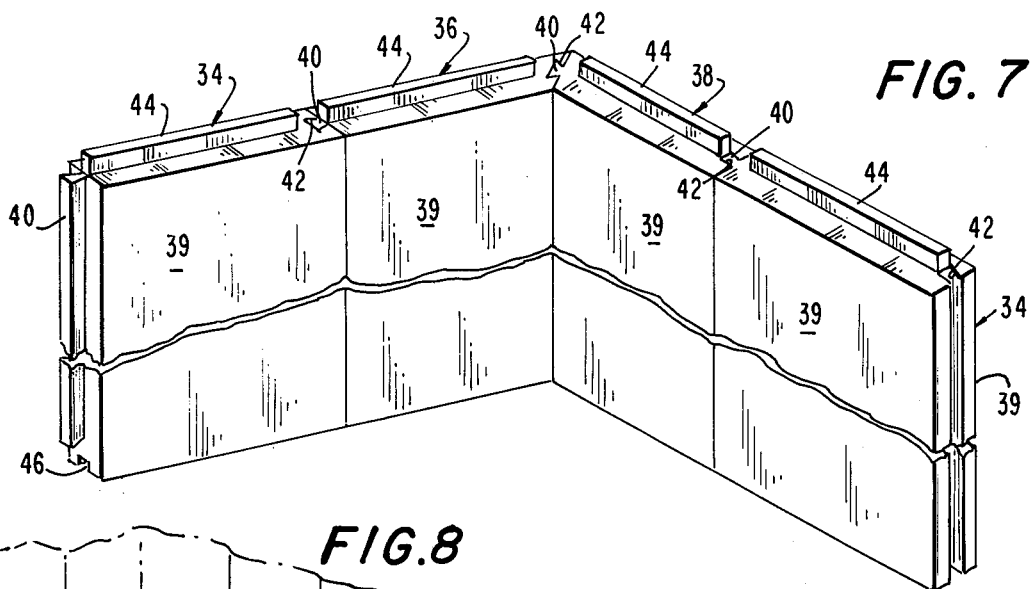
FIG. 7 is a perspective view, on an enlarged scale, of a portion of a structural wall showing details of the various blocks comprising the wall.

Referring not to the details of the drawing, and in particular to FIG. 1, there is shown a model high-rise building, indicated generally by the numeral 12, which incorporates objects and features of the present invention. The structure combines four generally vertical structural wall sections 15, 16, 17 and 18 and four supporting ledges 20, 22, 24, and 26 to simulate a number of contemporary architectural effects. The walls 15, 16, 17 and 18 form the outer shell of building 12, and each wall includes a number of right-angle bends corresponding to corners of the building. Ledge 22, which is supported on structural wall 16, supports structural wall 17 in a recessed position with respect to wall 16, so that a setback is formed about building 12. Ledge 20, which is supported on structural wall 15, supports structural wall 16 in a position where it extends beyond wall 15 so that an overhang is formed in building 12. Ledge 24 similarly forms an overhang in building 12. As best seen in FIG. 12, setback ledge 26 serves to support the generally flat roof 112 of the building 12.

The structural walls 15, 16, 17 and 18 and the flat roof 112 of the structure 12 are formed from modular, interlocking blocks of which only three types are required to construct the building 12: complementary corner-forming blocks 36, 38 and center panel blocks 34. Similarly, each of the supporting ledges 20, 22, 24, 26 is constructed from a plurality of ledge elements or brackets, which are designed to mount in a side-by-side arrangement on top of a supporting structural wall. Only three types of brackets are required to make the ledges in the structure of FIG. 1: center brackets 28, outside corner brackets 30, and inside corner brackets 32. From the foregoing, it will be appreciated that only six different types of elements are required to construct the entire building 12 of FIG. 1.

Referring now to FIG. 7, it will be observed that each of blocks 34, 36, 38 is a substantially flat plate member with parallel flat faces 39, 39 and is adapted to interconnect with other similar plate members at each of its lateral edges and ends. These blocks ae conveniently made of any sturdy plastic or plexiglass and could be provided in translucent form and in different colors to simulate various building materials, such as glass, concrete, stone, etc. In the preferred embodiment, each of the blocks is provided with a dovetailed tongue 40 on one lateral edge and a dovetailed channel 42 on the opposite lateral edge and, in addition, has a tongue 44 at one end and a complementary groove 46 at the other. Central blocks 34 are formed with both lateral edges and both ends perpendicular to the faces 39, 39 of the block, whereas the edge including the channel 42 is slanted at 45° or mitred; and each of blocks 38 is formed with its two ends and the edge including channel 42 perpendicular to its faces 39, 39, whereas the edge including tongue 40 is mitred. With the modular blocks constructed as described, one tier of a structural wall is formed by interlocking a plurality of blocks by means of the complementary dovetail tongues and channels. An inside corner is formed by joining a pair of corner blocks 36, 38 at their mitred edges as shown in FIG. 7; an outside corner is formed by turning both blocks 36 and 38 upside-down. When the next tier of the structural wall is formed, the channels 46 of the upper blocks are placed over the tongues 44 in the lower blocks to hold the second tier in place, and the second tier is formed by interlocking blocks at their edges in the same manner as the first tier. In this manner, the wall sections 15, 16, 17 and 18 are formed from modular blocks 34, 36 and 38.

The detailed construction of a center bracket 28 is best observed in FIGS. 4, 6, 9 and 10. Bracket 28 has a generally rectangular main wall 50 having lateral edges 52, an outer edge 54 and an inner edge 56. The bracket is designed to have a width (i.e. the distance between edges 52) equal to the width of one of center blocks 34. Along the edge 54 and generally perpendicularly to wall 50, there is secured an outer wall 58 which extends substantially above and below the wall 50. At the edge 56 and generally perpendicularly to wall 50, there is secured an inner wall 60, which is flush with the top of wall 50 and extends substantially therebelow. Each of the walls 58, 60 is thicker than the blocks 34, 36, 38 which form the structural walls of building 12 and each includes an upper and lower channel coextensive with the wall and adapted to receive one of the ends of a block 34: wall 58 includes upper channel 62 and lower channel 64, and wall 60 includes upper channel 66 and lower channel 68. Each of the lower channels 64, 68 also includes a central groove adapted to receive the tongue 44 of a modular block. As can be seen in FIG. 4, two spaced braces 70, 70 depend from wall 50 and are secured to each of walls 58 and 60 to provide rigidity and strength to bracket 28. The bottoms of braces 70 are curved to provide an attractive architectural effect when the bottom of bracket 28 is visible (see ledges 20 and 24 in FIG. 1).

The detailed construction of an outside corner bracket 30 is best illustrated in FIGS. 3, 5, 8 and 9. Bracket 30 includes a generally L-shaped main wall 72 having generally perpendicular lateral edges 74, an outer edge 76 having a right angle bend, and an inner edge 78 also having a right angle bend. Along the edge 76 and generally perpendicularly to wall 72, there is secured a wall 80 having a right angle bend and extending substantially above and below the wall 72. At the edge 78 and generally perpendicularly to wall 72, there is secured a wall 82 which has a right angle bend, is flush with the top of wall 72 and extends substantially therebelow. Each of walls 80 and 82 is thicker than the blocks 34, 36, 38 which form the structural walls of building 12, and each includes an upper and lower channel coextensive with the wall and adapted to receive one of the ends of the blocks 34, 36, 38. The wall 80 has an L-shaped upper channel 84 and an L-shaped lower channel 86 which are both dimensioned to receive the end of an assembly comprising a pair of interlocked corner blocks 36, 38 each having a center block 34 secured thereto, with the outside edges of blocks 34 coming flush with the edges 74. Similarly, wall 82 includes an upper L-shaped channel 88 and a lower L-shaped channel 90 which are both dimensioned to receive the ends of an interlocked pair of corner blocks 36, 38 with the outside edges of the corner blocks being flush with the edges 74. Lower channels 86, 90 each include a central groove adapted to receive the tongues 44 of modular blocks. Four braces 70, which are identical to the braces 70 in bracket 28, and one diagonal brace 71 all depend from wall 72 and are secured to each of walls 80 and 82 to provide rigidity and strength to bracket 30.

Figure 10:
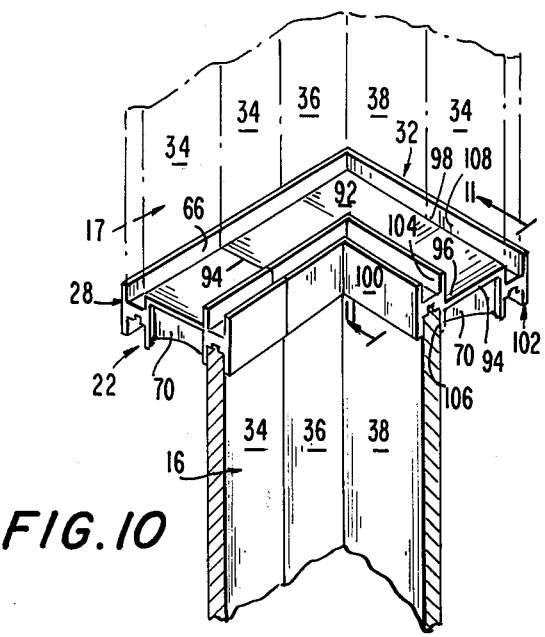
FIG. 10 is a fragmentary perspective view, on an enlarged scale, of circled area 10 of FIG. 1 and illustrates the construction of an inside setback corner.
Figure 9:
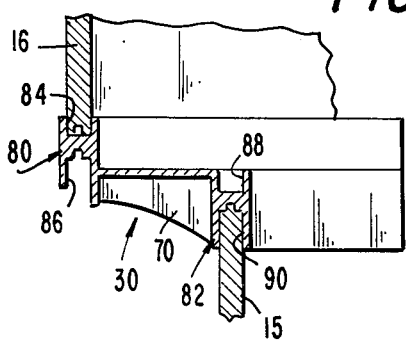
FIG. 9 is a sectional view taken substantially along contour 9—9 and looking in the direction of the arrows in FIG. 8.
Figure 11:
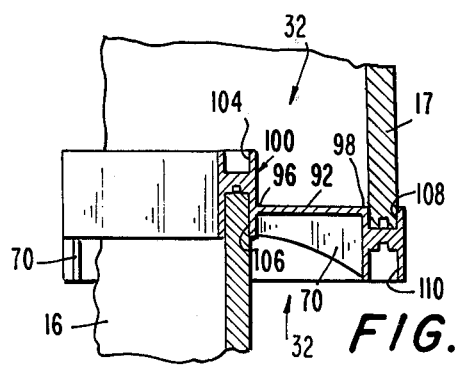
FIG. 11 is a sectional view taken substantially along contour 11—11 and looking in the direction of the arrows in FIG. 10.

The detailed construction of an outside corner bracket 32 is best illustrated in the FIGS. 10 and 11. Bracket 32 includes a generally L-shaped main wall 92 having generally perpendicular lateral edges 94, an outer edge 96 having a right angle bend and an inner edge 98 having a right angle bend. It should be observed that, in bracekt 32, the shorter edge is the outside edge, whereas in bracket 30, the shorter edge is the inside edge. Along outer edge 96, and generally perpendicularly to wall 92, there is secured an outer wall 100 having a right angle bend and extending substantially above and below the wall 92. At the edge 98 and generally perpendicularly to wall 92, there is secured an inner wall 102 which has a right angle bend, is flush with the top of wall 92 and extends substantially therebelow. Each of walls 100, 102 is thicker than the blocks 34, 36, 38 which frrm the structural walls of building 12, and each includes an upper and lower channel coextensive with the wall and adapted to receive an end of block 34, 36, 38. Wall 100 includes an L-shaped channel 104, and an L-shaped lower channel 106, each of which is designed to receive the ends of a pair of interlocked blocks 36, 38 with the outer edges of the blocks flush with the edges 94. Wall 102 includes an L-shaped upper channel 108 and an L-shaped lower channel 110, each of which is designed to receive one end of an assembly comprising a pair of interlocked corner blocks 36, 38 each having a center block 34 attached, with the outer edges of the blocks 34 flush with the edges 94 of bracket 32. The lower channels 106, 110 each include a central groove adapted to receive the tongues 44 of the modular building blocks. Like bracket 30, bracket 32 includes four braces 70 and one diagonal brace 71 which all depend from wall 92 and are secured to each of walls 100 and 102 to provide rigidity and strength to bracket 32.

Referring now to FIGS. 2 and 10, it will be observed how the brackets 28, 30, 32 are employed to produce the ledge 22 which forms a setback in building 12. The structural wall 15 is formed by interlocking blocks 34, 36, 38 to form tiers in the manner previously described. At each outside corner, an outside corner bracket 30 is mounted on wall 16 by pressing the bracket over the interlocked corner blocks 36, 38 and the adjacent center blocks 34, so that the lower channel 86 in the outer wall 80 in bracket 30 receives the upper ends of the blocks. At each inside corner of wall 16, an inside corner bracket 32 is mounted at the top of the wall so that the top ends of the interlocked blocks 36, 38 are received in the lower channel 106 of outer wall 100 of the bracket. Next, center brackets 28 are mounted on wall 16 to fill in the spaces between the corner brackets 30 and 32. Each of the center brackets 28 is mounted on wall 14 so that the lower channel 64 in outer wall 58 receives the upper end of a center block 34 and its lateral edges 52 are abutted against the lateral edges of each adjacent bracket.

With the ledge 22 constructed at the top of wall 16, structural wall 17 may now be added. The first tier of wall 17 is constructed as previously described by interlocking blocks 34, 36, 38 at their lateral edges. The wall 17 is held in place by inserting the lower ends of the blocks in the upper channel formed on the inner wall of each of brackets 28, 30, 32. Thus, an outside corner in wall 16 is anchored by inserting the lower ends of interlocked corner blocks 36, 38 into the upper channel 88 of inner wall 82 in a bracket 30; an inside corner in wall 17 is anchored by inserting the bottom end of an assembly comprising interlocked corner blocks 36, 38 and their next adjacent center blocks 34 into the upper channel 108 of inner wall 102 in a bracket 32; and the straight sections of wall 16 are anchored by inserting the lower end of a center block 34 into the upper channel of the inner wall 60 in each of center brackets 28. After the first tier of wall 17 is anchored, the second tier is constructed over the first tier in the previously described manner.

Figure 8:
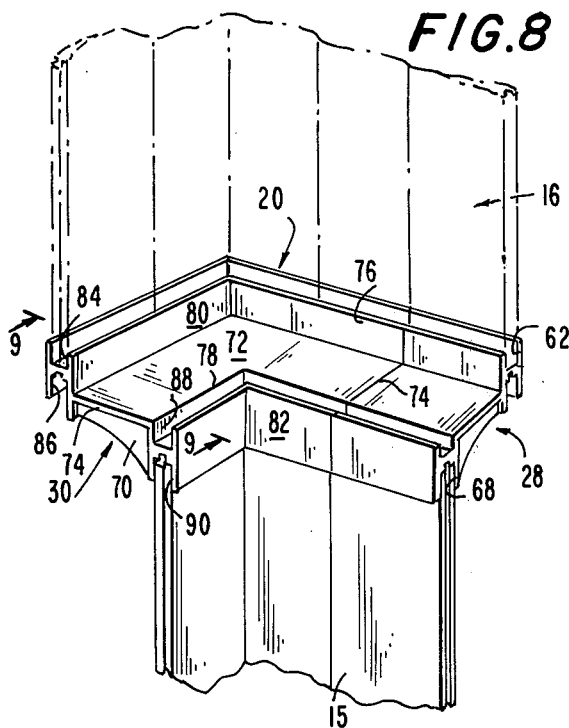
FIG. 8 is a fragmentary perspective view, on an enlarged scale, of circled area 8 of FIG. 1 as seen from the inside of the building, and illustrates the construction of an overhung outside corner.

The ledges 20 and 25, which form overhangs in the building 12 are similarly formed from the brackets 28, 30, 32. The primary difference is that each of the brackets is mounted so that the top of the wall which supports it is received in the lower channel of the bracket's inner wall and the wall which the bracket supports is anchored so that its lower end is received in the upper channel formed in the outer wall of the bracket. Referring for example to FIG. 8, it can be seen that the brackets 28 and 30 are mounted on wall 15 so that the upper end of the wall is received in the channels 68 and 90, respectively, and the wall 16 is anchored so that its lower end is received in the upper channels 62 and 84 formed in the outside walls of brackets 28 and 30 respectively.

Referring now to FIGS. 12, 13 and 14, it will be appreciated that the roof supporting ledge 26 is constructed on structural wall 18 in the same manner that the setback ledge 22 is constructed on structural wall 16. The flat roof 112 is formed entirely from interlocked center blocks 34 and is supported entirely on the main walls 50, 72 and 92 of brackets 28, 30 and 32 respectively. It will be appreciated that roof 112 could equally well be supported on an overhung supporting ledge constructed in the same manner as the ledges 20 and 24.

Although a specific embodiment of the invention has been disclosed for illustrative purposes, it will be appreciated by one skilled in the art that many additions, modifications and substitutions are possible without departing from the scope and spirit of the invention as defined by the accompanying claims. For example, additional interlocking blocks and brackets could be provided which would permit forming other than right-angle corners. This could include elements which would permit the formation of structures with various polygonal and arcuate shapes.

What is claimed is:

1. A bracket for use in a model building to create a supporting ledge in generally vertical structural walls forming the outer shell of said building, said bracket comprising:
   a generally horizontal main wall having bounding inner and outer edges and lateral edges each extending between said inner and outer edges;
   means disposed at, at least, one of said inner and outer edges for securing said bracket at the top of a fist of said structural walls; and
   means disposed at, at least, the other of said inner and outer edges for supporting a second of said structural walls, said supporting means being constructed and arranged to receive the bottom of said second structural wall;
   said supporting ledge being formed by securing a plurality of said brackets to the top of said first structural wall with lateral edges of adjacent brackets abutted and with the outer and inner edges of each bracket aligned with at least a portion of the corresponding edge of each bracket adjacent thereto.

2. A bracket in accordance with claim 1 wherein said inner and outer bracket edges are generally parallel.

3. A bracket in accordance with claim 1 and adapted for use in a building including corners formed by right-angle bends in the structural walls of said building, said bracket being used to construct the portion of said supporting ledge disposed in said building corner, said inner and outer bracket edges being substantially L-shaped.

4. A bracket in accordance with claim 1 including said securing means and said supporting means at each of said inner and outer edges, a plurality of brackets being used to construct both setback and overhung ledges, a setback ledge being constructed by securing said brackets to the top of said first structural wall by means of the securing means at said outer edge of each bracket so that the main wall of each bracket extends from the first structural wall toward the interior of said building, an overhung ledge being constructed by securing said brackets to the top of said first structural wall by means of the securing means at said inner edge of each bracket so that the main wall of each bracket extends from said first structural wall outwardly of said building.

5. A bracket according to claim 4 and further including inner and outer walls generally perpendicularly secured along said main wall at said inner and outer edges, respectively, said inner and outer walls each having a channel coextensive therewith at the lowermost and uppermost edges of said inner and outer walls, said channels being dimensioned to receive and retain ends of said structural walls so that said inner and outer wall upper and lower channels serve as said securing means and said mounting means, respectively.

6. A bracket according to claim 5 wherein the uppermost edge of said inner wall is substantially flush to said main wall and said inner wall extends substantially below said main wall, said outer wall extending substantially above and below said main wall, said bracket further including bracing means depending from said main wall and secured to each of said inner and outer walls to add rigidity and strength to said bracket.

7. A construction kit for model buildings, combining:
   a plurality of interlocking block elements constructed and arranged to be assembled into a roof and structural walls forming the outer shell of said building, at least two of said block elements being adapted to form a wall having a rightangle bend corresponding to a corner of said building; and
   a plurality of brackets in accordance with claim 1, at least one of said brackets having generally parallel inner and outer edges and being adapted to form a supporting ledge on a straight portion of a supporting wall, at least one of said brackets having generally L-shaped inner and outer edges and being adapted to form a supporting ledge in a corner of said building.

8. In a construction kit in accordance with claim 7, said brackets including said securing means and said supporting means at each of said inner and outer edges, said brackets being used to construct both setback and overhung ledges, a setback ledge being constructed by securing said brackets to the top of said first structural wall by means of the securing means at said outer edge of each bracket so that the main wall of each bracket extends from said first structural wall outwardly of said building.

9. In a construction kit in accordance with claim 8, each of said brackets further including inner and outer walls generally perpendicularly secured along said main wall at said inner and outer edges, respectively, said inner and outer walls each having a channel coextensive therewith at the lowermost and uppermost edges of said inner and outer walls, said channels being dimensioned to receive and retain ends of said structural walls so that said inner and outer wall upper and lower channels serve as said securing means and said mounting means, respectively.

10. A construction kit in accordance with claim 9 and including brackets wherein the uppermost edge of said inner wall is substantially flush to said main wall and said inner wall extends substantially below said main wall, said outer wall extending substantially above and below said main wall, said brackets further including bracing means depending from said main wall and secured to each of said inner and outer walls to add rigidity and strength to said bracket.

11. In a model building including a plurality of generally vertical structural walls forming the outer shell of said building, a ledge for supporting a portion of said building comprising a plurality of aligned brackets, each of said brackets comprising:
   a generally horizontal main wall having bounding inner and outer edges and lateral edges each extending between said inner and outer edges;
   means disposed at, at least, one of said inner and outer edges for securing said bracket at the top of a first of said structural walls; and
   means disposed at, at least, the other of said inner and outer edges for supporting a second of said structural walls, said supporting means being constructed and arranged to receive the bottom of said second structural wall;
   said supporting ledge being formed by securing a plurality of said brackets to the top of said first structural wall with lateral edges of adjacent brackets abutted and with the outer and inner edges of each bracket aligned with at least a portion of the corresponding edge of each bracket adjacent thereto.

12. A building according to claim 11 including brackets wherein said inner and outer edges are generally parallel.

13. In a building according to claim 11 and including corners formed by right-angle bends in the structural walls of said building, at least one of said brackets being used to construct the portion of said supporting ledge disposed in said building corner, said at least one bracket having inner and outer edges which are substantially L-shaped.

14. A building according to claim 11 wherein each of said brackets includes said securing means and said supporting means at each of said inner and outer edges, said brackets being used to construct both setbacks and overhangs in said building; a setback being constructed by securing said brackets to the top of said first structural wall by means of the securing means at said outer edge of each bracket so that the main wall of each bracket extends from said first structural wall toward the interior of said building, and mounting said second structural wall of said ledge by means of the mounting means at said inner edge of each bracket; an overhang being constructed by securing said brackets to the top of said first structural wall by means of the securing means at said inner edge of each bracket so that the main wall of each bracket extends from said first structural wall outwardly of said building, and mounting said second structural wall on said ledge by means of the mounting means at said inner edge of each bracket.

15. A building according to claim 14 wherein each bracket further includes inner and outer walls generally perpendicularly secured along said main wall at said inner and outer edges, respectively, said inner and outer walls each having a channel coextensive therewith at the lowermost and uppermost edges of said inner and outer walls, said channels being dimensioned to receive and retain ends of said structural walls so that said inner and outer wall upper and lower channels serve as said securing means and said mounting means, respectively.

16. A building according to claim 15 including brackets wherein the uppermost edge of said inner wall is substantially flush to said main wall and said inner wall extends substantially below said main wall, said outer wall extending substantially above and below said main wall, each bracket further including bracing means depending from said main wall and secured to each of said inner and outer walls to add rigidity and strength to said bracket.

* * * * *